UNITED STATES PATENT OFFICE.

HERMANN SENN, OF SZCZAKOWA, AND DAVID KLÜGER, OF TRZEBINIA, AUSTRIA-HUNGARY.

METHOD OF MANUFACTURING A POROUS MATERIAL.

No. 930,801.      Specification of Letters Patent.      Patented Aug. 10, 1909.

Application filed April 1, 1909. Serial No. 487,185.

*To all whom it may concern:*

Be it known that we, HERMANN SENN and DAVID KLÜGER, the first a citizen of the Republic of Switzerland, and residing at Szczakowa, in Galicia, Austria-Hungary, the second a subject of the Emperor of Austria-Hungary, and residing at Trzebinia, in Galicia, Austria-Hungary, have invented certain new and useful Improvements in Methods of Manufacturing a Porous Material; and we do hereby declare the following to be a full, clear, and exact description of the invention, such as will enable others skilled in the art to which it appertains to make and use the same.

This invention relates to the manufacture of a porous and light material especially adapted to be used as a heat insulating means, as a filtering mass and in certain cases as a building material and is based on the fact that slate of any kind possessing a dense structure and containing little quantities of organic substances, such as mica-slate, argillaceous slate, coal slate and the like, when submitted to calcination at a suitable temperature swells and assumes a cell-like structure. The primary materials for the manufacture of the porous product are dense species of slate containing an admixture of bituminous or other organic substances in moderate quantities, that is up to about 10%. The chemical analysis of slate of this kind furnishes the following result:

| | |
|---|---|
| Loss by calcination | 6.30% |
| Silicic acid | 55.95% |
| Alumina and ferric oxid | 33.50% |
| Calcium oxid | 1.65% |
| Magnesium oxid | 1.98% |
| Total | 99.38% |

This material shows a very dense structure. The calcination is effected in a chamber furnace heated by means of gas, for example producer gas, to a temperature of 1200° C. If pieces or plates of the slate of 10 to 20 mm. thickness are submitted to this temperature the remarkable phenomenon of a very considerable increase of volume is observed which entails an increase of the thickness up to 100 to 130 mm. In this manner the stone loses its previously dense structure and assumes a porous cell-like structure which enables the product to be used in the shape of pieces or plates for heat insulating purposes and in the shape of smaller pieces or of grains for filtering purposes.

In carrying out the calcination care should be taken that the material be charged into the furnace in layers of so little a height that the pieces near the bottom should not be prevented from swelling or even should not be crushed by the pressure of the pieces lying above them. It is necessary to always regulate the temperature during calcination to such a degree that sintering of the material is avoided.

In order to obtain the material which is to be used for producing heat insulating layers and sound muffling partitions, either the primary material may be cut into plates and by calcining the latter porous plates ready for use are immediately obtained; or pieces of the afore mentioned slate of any shape may be calcined and the calcined material is sawed into the shape of plates, blocks or the like or used directly or molded to any shape after mixing the material with a binding agent of any kind.

Claim.

1. The method of manufacturing a porous material which consists in calcining slate containing small quantities of organic substances whereby the material swells and assumes a cellular structure.

2. The method of manufacturing a porous material which consists in subjecting slate, containing about 10 per cent. of organic substances, to a heat of about 1200 degrees C. whereby the material swells and a cellular structure is obtained.

3. An insulating and filtering material consisting of calcined slate.

In testimony that we claim the foregoing as our invention, we have signed our names in presence of two subscribing witnesses.

HERMANN SENN.
               DAVID KLÜGER.

Witnesses:
    JOSEF RUBARCH,
    ROBERT W. HEINGARTNER.